(12) United States Patent
Stählin et al.

(10) Patent No.: US 9,003,020 B2
(45) Date of Patent: Apr. 7, 2015

(54) DATA INTEGRITY FOR COMMUNICATION WITH COEQUAL SUBSCRIBERS

(75) Inventors: Ulrich Stählin, Eschborn (DE); Robert Gee, Lake Barrington, IL (US); Marc Menzel, Weimar/Lahn (DE)

(73) Assignee: Continental Teves AG & Co. oHG (DE)

( * ) Notice: Subject to any disclaimer, the term of this patent is extended or adjusted under 35 U.S.C. 154(b) by 363 days.

(21) Appl. No.: 13/260,774

(22) PCT Filed: Mar. 15, 2010

(86) PCT No.: PCT/EP2010/053315
§ 371 (c)(1),
(2), (4) Date: Dec. 19, 2011

(87) PCT Pub. No.: WO2010/112327
PCT Pub. Date: Oct. 7, 2010

(65) Prior Publication Data
US 2012/0084440 A1    Apr. 5, 2012

(30) Foreign Application Priority Data
Apr. 3, 2009   (DE) .................. 10 2009 002 190

(51) Int. Cl.
| | | |
|---|---|---|
| H04L 29/08 | (2006.01) |
| G01S 5/00 | (2006.01) |
| G08G 1/16 | (2006.01) |
| H04L 12/407 | (2006.01) |
| H04L 12/40 | (2006.01) |

(52) U.S. Cl.
CPC .............. *H04L 67/125* (2013.01); *G08G 1/161* (2013.01); *G01S 5/0072* (2013.01); *H04L 12/407* (2013.01); *H04L 2012/40273* (2013.01); *H04L 67/306* (2013.01); *H04L 67/12* (2013.01)

(58) Field of Classification Search
CPC .............................. G08G 1/161; G01S 5/0072
USPC .......................................................... 709/224
See application file for complete search history.

(56) References Cited

U.S. PATENT DOCUMENTS

| | | | |
|---|---|---|---|
| 6,353,615 | B1 | 3/2002 | Bohne |
| 7,099,633 | B1* | 8/2006 | Leason ........................... 455/99 |
| 2003/0032464 | A1* | 2/2003 | Sprigg et al. .................. 455/574 |
| 2005/0188052 | A1* | 8/2005 | Ewanchuk et al. ........... 709/217 |
| 2005/0242971 | A1* | 11/2005 | Dryer ....................... 340/870.11 |
| 2006/0120289 | A1 | 6/2006 | Cunningham |
| 2006/0293029 | A1* | 12/2006 | Jha et al. ....................... 455/411 |
| 2007/0150631 | A1 | 6/2007 | Druke |

(Continued)

FOREIGN PATENT DOCUMENTS

| | | |
|---|---|---|
| DE | 19620137 A1 | 11/1997 |
| DE | 102006059378 A1 | 9/2007 |

OTHER PUBLICATIONS

International Search Report issued in PCT/EP2010/053315 filed Mar. 15, 2010; mailed Jun. 23, 2010.

*Primary Examiner* — Joseph E Avellino
*Assistant Examiner* — James Conaway
(74) *Attorney, Agent, or Firm* — RatnerPrestia

(57) ABSTRACT

A communication device for a subscriber in a communication network of coequal subscribers, which communication device has a communication unit and a control unit. The received messages are checked for rule compliance. If a message does not comply with a particular rule, a disconnection signal is sent to the transmitter of the message.

13 Claims, 1 Drawing Sheet

(56) References Cited

U.S. PATENT DOCUMENTS

| | | | |
|---|---|---|---|
| 2009/0271112 A1* | 10/2009 | Basnayake | 701/213 |
| 2010/0202346 A1* | 8/2010 | Sitzes et al. | 370/328 |
| 2011/0034201 A1* | 2/2011 | Hamada et al. | 455/517 |
| 2011/0196969 A1* | 8/2011 | Tarte et al. | 709/227 |
| 2012/0034905 A1* | 2/2012 | Stahlin et al. | 455/414.1 |
| 2012/0077457 A1* | 3/2012 | Howarter et al. | 455/404.2 |
| 2012/0225673 A1* | 9/2012 | Juhasz | 455/456.4 |
| 2012/0244883 A1* | 9/2012 | Tibbitts et al. | 455/456.2 |
| 2013/0166387 A1* | 6/2013 | Hoffberg | 705/14.63 |
| 2013/0253732 A1* | 9/2013 | Patel et al. | 701/2 |
| 2014/0081793 A1* | 3/2014 | Hoffberg | 705/26.3 |

\* cited by examiner

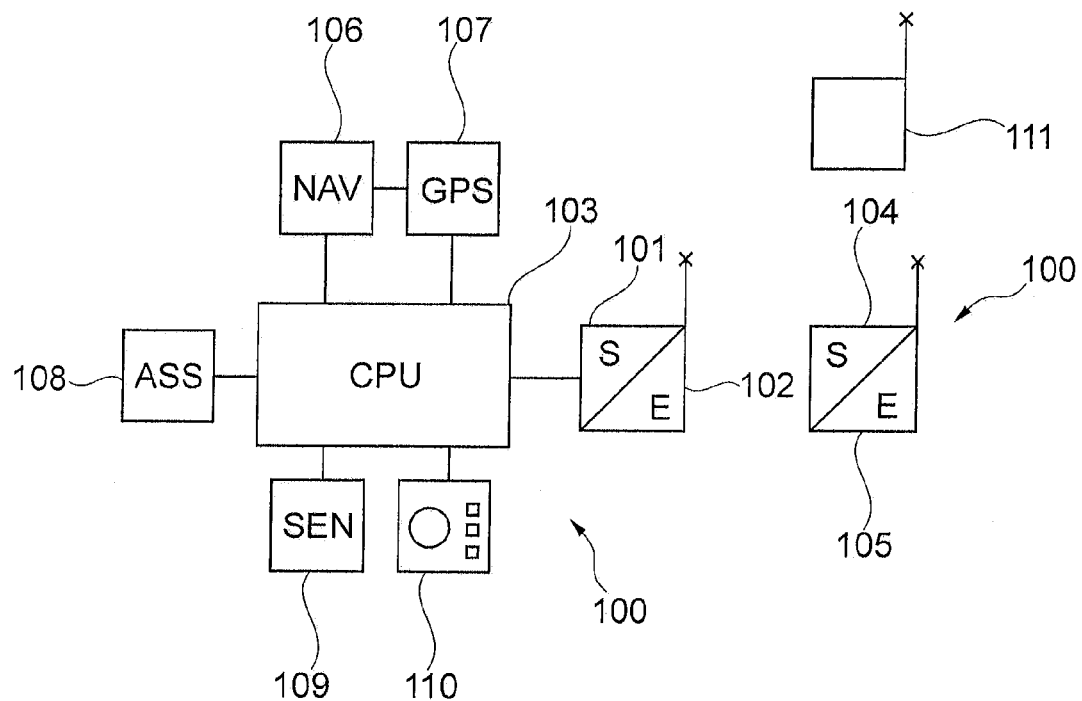
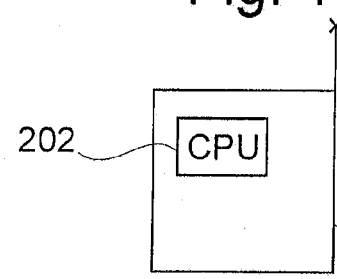
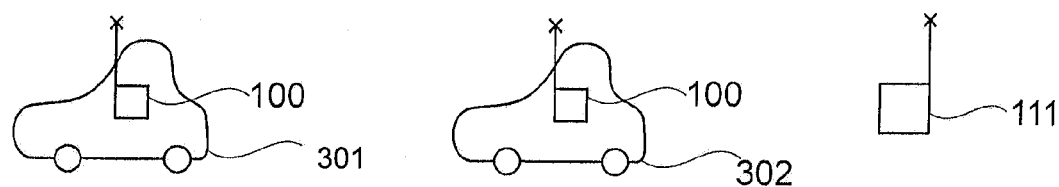
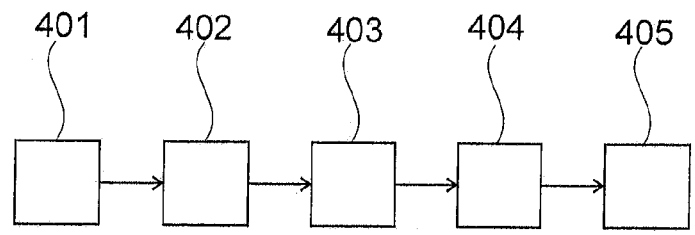

DATA INTEGRITY FOR COMMUNICATION WITH COEQUAL SUBSCRIBERS

CROSS REFERENCE TO RELATED APPLICATIONS

This application is the U.S. National Phase Application of PCT/EP2010/053315, filed Mar. 15, 2010, which claims priority to German Patent Application No. 10 2009 002 190.6, filed Apr. 3, 2009, the contents of such applications being incorporated by reference herein.

FIELD OF THE INVENTION

The invention relates to communication between various subscribers. In particular, the invention relates to a communication device for communication with coequal subscribers, a communication network having a plurality of such communication devices, a vehicle having such a communication device, a method for communication with a coequal subscriber, a program element and a computer-readable medium.

BACKGROUND OF THE INVENTION

Vehicle-to-vehicle communication and vehicle-to-infrastructure communication (also called C2X or vehicle-to-X communication) by means of dedicated short range communication (DSRC), for example by means of WLAN 802.11p, or by means of cellular radio, for example by means of GPRS, UMTS, LTE, is used to transmit messages between adjacent vehicles or an infrastructure and a vehicle. For the purpose of authentication, it is possible to use certificates, e.g. certificates with a time limit.

In communication network technology, the Token Ring method is known, said method being stipulated in the specification IEEE 802.5. In the case of vehicle-to-X communication, there are multiple aims from the point of view of security engineering. By way of example, these are preserving the anonymity of the transmitter (the transmitter should not be able to be tracked), authenticating a transmitter (a transmitter can prove that it is trustworthy), and protecting against information falsification or information manipulation.

SUMMARY OF THE INVENTION

An aspect of the invention provided a pure vehicle-to-vehicle communications system (C2C system) without infrastructure units which affords a high level of data integrity.

A communication device, a communication network, a vehicle, a method, a computer-readable medium and a program element based on the features of the independent claims are specified. Developments of the invention can be found in the subclaims.

The features described below can be combined with one another. In particular, features which are described below for the communication device, for example, can also be implemented as method steps, and vice versa.

It should be noted that when a vehicle is mentioned below, this can be understood to mean a road vehicle, such as a car, heavy goods vehicle or bus, a rail vehicle, a water vehicle or an aircraft, such as a helicopter or an airplane.

In accordance with one exemplary embodiment of the invention, a communication device for communication with a coequal subscriber is specified which has a communication unit and a control unit. The communication unit is designed to receive a message from an adjacent subscriber. The control unit is designed to check whether the received message complies with a particular rule and to trigger disconnection of a transmitter if the received message does not comply with the particular rule.

A central infrastructure, which distributes certificates for the time limit, for example, is not necessary for this. If a subscriber does not behave in compliance with the rules, it would be the case, in the latter instance, that it is not provided with any further certificates, for example, which it can use to "sign" its information.

In accordance with aspects of the invention, if a subscriber does not behave in compliance with the rules, the communication device of an adjacent subscriber or even the subscriber itself can detect this, since a check is performed to determine whether received messages comply with a particular or a plurality of particular rules. By way of example, a check can be performed to determine whether the overall length of the message is correct. If this is not the case, this indicates that the transmitter is not acting in compliance with the rules. In this case, a disconnection signal is sent to the transmitter (or to a receiver associated therewith). It is also possible to check whether the number of data packets received per unit time complies with the rules. If too many data packets are received per unit time, this can indicate that the individual communication device has a faulty reception path, in which case this reception path can be disconnected, for example.

A central transmission station in the form of a server or an infrastructure is not necessary for this. On the contrary, the communication devices according to aspects of the invention can communicate with one another on an equal footing and can check one another or themselves without the need for external intervention. Therefore, this is a pure C2C solution.

A basic assumption is that a vehicle in a system must always be able to deal with wrong, disrupted or otherwise incorrect messages. It is possible only with difficulty to create a system which is 100% secure in its connections. In addition, it is usually desirable to disconnect an erroneous subscriber from the communication network, even if this disconnection has a (temporary) time limit, instead of allowing it to continue to "soil" the air interface with erroneous messages.

In order to allow this disconnection without a central control unit (a central "boss", that is to say an infrastructure, for example a server) in the system, each communication subscriber (communication device) may be designed such that it can take an active role in the communication, so that the network is protected cooperatively.

The communication device (the C2X subscriber) can recognize with a certain probability which messages cannot be used or are wrong, in order to become active on the basis thereof. Each received message is checked to determine whether it complies with the rules and whether the data sent can be correct. By way of example, these rules may be the following rules:

Is the overall length of the message correct? Are the lengths of the individual elements of the message correct?
Can the message be interpreted? That is to say, does the bit sequence make sense and can it be decoded?
Is the checksum (if used) correct?
Is the structure of the message correct, that is to say, are the individual contents at the right location?
Is the coding of the message correct?
If a certificate is used for authentication: has the message been received without alteration?
Does the relative position of the transmitter suit the reception range? Example: if the range of the communication is 500, m, it is not possible for messages to be received directly if their transmission position according to the message is 2, km away.

Do the position, speed, acceleration, steering wheel angle, brake pedal position, gas pedal position, yaw rate, . . . (in each case if available), that is to say driving dynamics variables, fit in with one another? In this case, the trend of multiple messages should be monitored.

Do the position, speed, acceleration, etc. fit in with the data from other vehicles in the surroundings? A vehicle traveling behind another vehicle should be at approximately the speed of said other vehicle, for example.

Does the transmission frequency fit in with the permitted or expected transmission frequency? If a transmission frequency of 2, Hz has been agreed for normal cases and a transmission frequency of up to 10, Hz has been agreed in the case of an emergency and if a subscriber transmits at 5, Hz even though there is no special instance and no emergency, this can be rated as an error.

Does the received position fit in with the surroundings, taking account of the positioning accuracy? Example: if a position is sent which is 50, m above or below the ground, even though no bridge or no tunnel is to be expected in the vicinity, this can be rated as an error.

Does an action message (event flag) fit in with the rest of the data? Example: if a message warns of a faulty vehicle and if said vehicle moves at different speeds over a relatively long period, this can be rated as an error.

This is not an exhaustive list but demonstrates multiple possibilities.

In accordance with a further exemplary embodiment of the invention, the communication device is a vehicle communication device in a vehicle, wherein the adjacent subscriber is a communication device in an adjacent vehicle.

In accordance with a further exemplary embodiment of the invention, the transmitter is part of the communication unit in the adjacent vehicle.

Alternatively, the transmitter may be part of the vehicle's own communication unit.

In other words, it is thus possible both for the other communication subscriber to be monitored and for the communication appliance to monitor itself.

In accordance with a further exemplary embodiment of the invention, the communication device is designed to transmit a disconnection command generated by the control unit to the transmitter for the purpose of triggering the disconnection.

In accordance with a further exemplary embodiment of the invention, the communication device is designated to evaluate disconnection commands received by the transmitter and to deactivate the transmitter and/or a receiver if the result of the evaluation is that disconnection of the transmitter is necessary.

In this case, disconnection is thus not carried out "blind" when an appropriate disconnection command is received. On the contrary, a plurality of such disconnection commands, from the same transmitter or from different transmitters, are collected and evaluated and analyzed, so that it is then possible to decide whether disconnection is necessary.

In accordance with a further exemplary embodiment of the invention, the communication device is designed to disconnect the transmitter at the level of communication chip in the transmitter.

In accordance with a further exemplary embodiment of the invention, the communication chip has a processor which is integrated in the hardware of the chip, wherein the processor is designed to disconnect the chip.

In accordance with a further exemplary embodiment of the invention, a communication device is specified in which the transmitter is part of the communication unit of the subscriber (that is to say of its own vehicle, for example).

In accordance with a further exemplary embodiment of the invention, the communication device is designed to automatically recognize an error in a reception channel of the transmitter by counting received messages given a different number of transmitted data packets per unit time.

In accordance with a further exemplary embodiment of the invention, the communication device is designed to change a vehicle identification at stipulated times. By way of example, all communication devices in a communication network can change their vehicle identification or subscriber identification at the same times (that is to say in sync).

In accordance with a further exemplary embodiment of the invention, a communication network is specified which has a plurality of communication devices described above and below.

In accordance with a further exemplary embodiment of the invention, a method for communication with a coequal communication subscriber is specified in which a message is received from an adjacent subscriber and a check is then performed to determine whether the received message complies with a particular rule. If the received message does not comply with a particular rule, disconnection of a transmitter is triggered by the receiver of the message. This transmitter may be located with the receiver or with the adjacent subscriber.

In accordance with a further exemplary embodiment of the invention, a program element is specified which, when executed on a processor in a communication device, instructs the processor to perform the method steps described above and below.

In this case, the computer program element may be part of a piece of software, for example, which is stored on a processor in the communication device. The processor may likewise be the subject matter of the invention. In addition, this exemplary embodiment of the invention comprises a computer program element which uses the invention right from the outset, and also a computer program element which, by virtue of an update, prompts an existing program to use the invention.

In accordance with a further exemplary embodiment of the invention, a computer-readable medium is specified which stores a program element which, when executed on a processor in a communication device, instructs the processor to perform the method steps described above and below.

BRIEF DESCRIPTION OF THE DRAWINGS

The invention is best understood from the following detailed description when read in connection with the accompanying drawings. Included in the drawings is the following figures:

FIG. 1 shows a communication network with a plurality of communication devices in accordance with an exemplary embodiment of the invention.

FIG. 2 shows a communication chip in a communication device in accordance with an exemplary embodiment of the invention.

FIG. 3 shows two vehicles with communication devices in accordance with an exemplary embodiment of the invention.

FIG. 4 shows a flowchart for a method in accordance with an exemplary embodiment of the invention.

DETAILED DESCRIPTION OF THE PREFERRED EMBODIMENTS

The illustrated figures are schematic and not to scale. In the figures, the same reference symbols are used for the same or similar elements.

FIG. 1 shows a communication network with two communication devices 100 and also with an infrastructure device 111, for example a server. In accordance with this exemplary embodiment, the infrastructure device 111 can participate in the communication. This participation is not necessary, however.

The left-hand communication device 100 has a communication unit with a transmitter 101 and a receiver 102. In addition, a control unit 103 is provided which is coupled to the communication unit 101, 102 so as to be able to communicate.

The communication devices 100 shown in FIG. 1 may be installed in a vehicle, for example. In this case, it should be pointed out that the data interchange between individual components 101, 102, 106 to 110 and the control unit 103 takes place by wire and/or (in some exemplary embodiments) wirelessly.

The control unit 103 also has a navigation unit 106, a satellite position-finding unit 107, which is based on GPS signals, for example, a driver assistance system 108, a vehicle sensor system and/or surroundings sensor system 109 and a man/machine interface 110 connected to it.

In addition, it should be pointed out that, within the context of the present invention, GPS is representative of all global navigation satellite systems (GNSS), such as GPS, Galileo, GLONASS (Russia), Compass (China) or IRNSS (India).

The second communication device likewise has a transmission unit 104 and a reception unit 105.

The relevant control unit (not shown) is integrated in the transmission unit and/or the reception unit, for example.

The validation of the received messages serves firstly for the vehicle's own vehicle security, since only such messages as are also classified as "correct" are used for further analysis. On the other hand, the validation results can also be used for cooperative monitoring of all the subscribers.

This cooperative monitoring is akin to IBM Token Ring. Thus, a communication subscriber A can disconnect another subscriber B if it is erroneous. To this end, subscriber A sends a message to subscriber B which prompts said subscriber B to disconnect itself. In this case, the disconnection takes place on very low layers of the communication stack, that is to say on the MAC layer or the data link layer, for example. This allows problems with a communication subscriber to be recognized and rectified without a central entity.

In contrast to Token Ring, a wireless communication link basically involves an infinite number of listeners (in the case of Token Ring, this is by definition only ever one). In addition, a wired connection may involve a physical mechanism (for example a dedicated connection) for error handling, which is not possible with wireless communication techniques. In the case of wired communication, it is also always known who has sent the disconnection command, this needing to be ascertained by an additional mechanism in the case of wireless communication.

In both solutions (wired or wireless), it is advantageous if the disconnection mechanism is effected at communication chip level. This makes the method very insensitive to erroneous applications.

If, in the case of C2X, vehicle A now recognizes erroneous behavior by vehicle B (see above methods) over a relatively long period of time (for example one minute), a message is sent to vehicle B which signals to it that it is operating erroneously. Additionally, from this time onward, the messages from vehicle B can be ignored by vehicle A over a particular period of time (for example one hour). Optionally, the identification (ID) or another recognition pattern and/or, the position of the vehicle B can be stored in the vehicle A. Thus, an engineer is later able to comprehend what the unit in vehicle A has done.

The communication unit in vehicle B now checks the received disconnection messages for a pattern. As soon as disconnection messages are received from a minimum number of other vehicles (for example five other vehicles) within a particular period of time (for example one hour), the vehicle B stops sending and then only receives. In addition, as described above, the data which have led to the disconnection are optionally recorded so that they can be made available to an engineer.

If the communication unit in the vehicle B continues to receive disconnection messages (for example again from five different vehicles), the receiver is also deactivated in addition. The change in the communication mode (reception only or complete disconnection) is signaled to the applications in the vehicle and possibly to the driver.

After a stipulated time (for example one hour), the communication module (communication device) activates itself again. This makes it difficult for (possibly intentional) erroneous disconnection messages to be able to lead to permanent deactivation of the communication module. The communication module remembers how often it has been disconnected. If disconnection is now necessary again within a prescribed period of time (for example eight hours), it is disconnected for longer this time. When the disconnection counter reaches a maximum value, the communication unit is deactivated permanently and a piece of service information is transmitted to the driver (for example by a signal lamp) and possibly automatically to the vehicle service center.

The described method for disconnection can be effected in the communication chip 201 (see FIG. 2). However, the erroneous sending can also be recognized at application level.

If a plurality of channels are used, the method can be applied to each of the channels individually or else can be considered over all of the channels. When a plurality of transceivers are used, the method can likewise be used for each transceiver separately or else for all of the transceivers.

In this case, the times described relate, for example, to the actual "travel time" for the recognition of the disconnection messages and to the "real" time for the deactivation. In other words, for the recognition of the disconnection messages, the time for which the vehicle is switched off is not included, the deactivation also being able to be effected in a period of time during which the vehicle is in the garage.

The method described is very robust. By way of example, this means that:

Erroneous or "malicious" modules can be removed from the network. However, this is done only if a plurality of network subscribers "vote for this".

Erroneous disconnection messages can be tolerated.

Malicious disconnection requires a high level of complexity. By way of example, the vehicle to be disconnected needs to be tracked over a relatively long period of time.

The disconnection takes place on low levels of the communication stack (for example within the hardware) and is therefore difficult to crack.

By jointly logging the disconnection process both in the transmitter and in the receiver, it is possible to reconstruct the situation, and hence legal investigations can be assisted, for example.

Disconnection of the communication unit increases the security of the vehicle, since it makes it difficult for hackers to use erroneous messages to penetrate the system. At the same time, however, the other security systems are not affected by this disconnection, and therefore the overall security of the vehicle is maintained.

In order to reactivate a communication unit (communication device), the engineer needs to use a PUK, for example, such as a SIM card. As in the case of a SIM card, the system can deactivate itself permanently if anyone attempts to crack this method or to penetrate this system illegally. In this case, every OEM can use a standard PUK for its communication systems in order to facilitate the work. Any reactivation using a PUK is retained (recorded) in order to be able to trace back this information for guaranteed claims, for example.

If it is not possible to integrate the disconnection algorithm into the hardware of the communication chip 201, it is at least possible to integrate a processor 202 into the chip hardware. This processor can then load the necessary program for itself from a non-writeable memory (for example a ROM) when the vehicle is started. However, it is necessary for the processor to be able to check whether the disconnection algorithm is present in the loaded program code. This is done using appropriate test routines in the loaded code, for example. This solution makes it possible to dispense with a secure memory and hence a secure processor.

In order to prevent systems in which the reception path is disrupted, that is to say for example systems which send an excessively large number of data packets or which send data packets at excessive transmission power or systems which use up excessive bandwidth, systems which establish that they have received no or only very low-power data over a relatively long period of time should reduce their emission to a minimal number of emissions. By way of example, what are known as network beacons can be sent at a maximum possible interval of time, and only event information from the highest level of urgency can then be sent.

If the number or the strength of the received data then changes, the system is able to recognize that it is erroneous and can disconnect itself or be disconnected by the disconnection message from the other vehicles. Otherwise, it can assume that the low number of data packets or the low strength of the data can be attributed to the ambient conditions for the vehicle.

The IDs of the vehicles (vehicle identifications) are changed regularly and for all vehicles simultaneously. In order to manage without an infrastructure in this case too, it is possible to supply the vehicle right at the beginning with a certified set of IDs which suffice the vehicle life long (or at least long enough for them not to have to be "reloaded" too often) in order to ensure safe operation of the communication device. These IDs may be explicit, so that authorities become able, if necessary, to reconstruct the identity of the transmitter (that is to say of the vehicle). However, this is possible only if the authority has the ID list available, for example. Otherwise, the IDs should be of such a nature that, without knowledge of the complete ID list for a vehicle, it is not possible to infer the identity of the vehicle and the private domain remains protected.

A further important aspect of an exemplary embodiment of the invention is the authentication of special subscribers, such as emergency vehicles. Since there is no 100% certainty in this case either, it is important for these vehicles to be able to be recognized, so that, if they have falsely impersonated a special subscriber, they can be tracked.

The authentication for this special subscriber should be effected using an asymmetric method. In this case, each vehicle may have one or more public keys. The special vehicles send private keys in order to encrypt their complete messages. In this case, the message should at any rate contain the current transmission time and/or the position of the transmitter so that it is not a simple matter to copy messages 1:1.

If an old time or an incongruous position is recognized, the message is rejected by the receiver. The public keys may have a time limit in a similar manner to the IDs and can be changed at a fixed time. Hence, stolen private keys become useless no later than at this change time.

It is likewise possible for each vehicle to be provided with a fixed set of pubic keys, for example 100, of them. At the beginning, only private keys are used, which can be decrypted using the first public key. If this private key has been cracked, it is changed to the second private key, etc. So as now to prevent a vehicle from continuing to accept the old keys, public keys with a lower number are marked as "used" as soon as a message is received which fits in with a higher public key.

The method described can be used generally for all communication techniques, that is to say for example DSRC based on 802.11p, C2X using RKE, UMTS, LTE, WiMAX, IEEE 802.11a/b/g/n, Bluetooth, ZigBee, An infrastructure for ensuring data integrity in the case of C2C communication is not necessary.

FIG. 3 shows two vehicles 301, 302 which each have a communication device 100. The communication device can, but does not have to, be permanently installed in the vehicle. It may also be a mobile communication device. It is also possible for, by way of example, the transmission/reception unit 101, 102 of the communication device to be mobile (for example a mobile telephone) and for the control unit with the components connected thereto to be permanently installed in the vehicle.

FIG. 4 shows a flowchart for a method in accordance with an exemplary embodiment of the invention. In step 401, an adjacent communication device emits a message which is received in step 402 by the vehicle's own communication device. The control unit in the vehicle's own communication device checks, in step 403, whether the received message complies with all stipulated rules or whether one of the rules is infringed. If one or more of the rules are infringed, the control unit is able to decide that the transmitter of the message needs to receive a disconnection message. This disconnection message is emitted in step 404 by the vehicle's own communication device and is sent to the transmitter of the original message.

In step 405, the transmitter analyzes this and other received disconnection messages and then automatically disconnects itself for a predetermined period of time (for example one hour).

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above. Reference symbols in the claims should not be regarded as restrictions.

The invention claimed is:

1. A communication device for communication with a coequal subscriber, said communication device comprising:
    a communication unit for receiving a message from an adjacent subscriber communication device; and
    a control unit for:
        checking whether the received message complies with a particular rule, and
        transmitting a disconnect message to the adjacent subscriber communication device in response to the received message not complying with the particular rule, the disconnect message prompting the adjacent subscriber communication device to disconnect itself at a level of a communication chip in a transmitter of the adjacent subscriber communication device when the disconnect message is an Nth disconnect message received by the adjacent subscriber communication device, wherein N>1.

2. The communication device as claimed in claim 1,
wherein the communication device is a vehicle communication device in a vehicle; and
wherein the adjacent subscriber is a communication device in an adjacent vehicle.

3. The communication device as claimed in claim 1, wherein the transmitter is part of the communication unit in the adjacent vehicle.

4. The communication device as claimed in claim 1, wherein the communication device is configured to transmit a disconnection command generated by the control unit to the transmitter for the purpose of triggering the disconnection.

5. The communication device as claimed in claim 4, wherein the communication device is configured to evaluate disconnection commands received by the transmitter and to deactivate at least one of the transmitter and a receiver if the result of the evaluation is that it is necessary to disconnect the transmitter.

6. The communication device as claimed in claim 1,
wherein the communication chip has a processor which is integrated in the hardware of the chip; and
wherein the processor is configured to disconnect the chip.

7. The communication device as claimed in claim 1, wherein the transmitter is part of the communication unit in the vehicle.

8. The communication device as claimed in claim 7, the communication device is configured to automatically recognize an error in a reception channel of the transmitter by counting received messages given a different number of transmitted data packets per unit time.

9. The communication device as claimed in claim 1, the communication device is configured to change a vehicle identification at stipulated times.

10. A communication network, having a plurality of communication devices as claimed in claim 1.

11. A vehicle having a communication device as claimed in claim 1.

12. A method for communication with a coequal subscriber, said method comprising:
receiving a message from an adjacent subscriber communication device;
checking whether the received message complies with a particular rule; and
transmitting a disconnect message to the adjacent subscriber communication device in response to the received message not complying with the particular rule, the disconnect message prompting the adjacent subscriber communication device to disconnect itself at a level of a communication chip in a transmitter of the adjacent subscriber communication device when the disconnect message is an Nth disconnect message received by the adjacent subscriber communication device, wherein N>1.

13. A non-transitory computer-readable medium which stores a program element which, when executed on a processor in a communication device, instructs the processor to perform the steps comprising:
receiving a message from an adjacent subscriber communication device;
checking whether the received message complies with a particular rule; and
transmitting a disconnect message to the adjacent subscriber communication device in response to the received message not complying with the particular rule, the disconnect message prompting the adjacent subscriber communication device to disconnect itself at a level of a communication chip in a transmitter of the adjacent subscriber communication device when the disconnect message is an Nth disconnect message received by the adjacent subscriber communication device, wherein N>1.

* * * * *